(12) United States Patent
Aizono et al.

(10) Patent No.: US 12,719,580 B2
(45) Date of Patent: Aug. 25, 2026

(54) OPTICAL SPACE COMMUNICATION APPARATUS, CONTROL METHOD FOR CONTROLLING OPTICAL SPACE COMMUNICATION APPARATUS, AND CONTROL APPARATUS FOR CONTROLLING OPTICAL SPACE COMMUNICATION APPARATUS

(71) Applicant: NEC Corporation, Tokyo (JP)

(72) Inventors: Masaki Aizono, Tokyo (JP); Hisashi Mizumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 188 days.

(21) Appl. No.: 18/520,722

(22) Filed: Nov. 28, 2023

(65) Prior Publication Data

US 2024/0187100 A1 Jun. 6, 2024

(30) Foreign Application Priority Data

Dec. 1, 2022 (JP) ................................ 2022-193136

(51) Int. Cl.
*H04B 10/50* (2013.01)
*H04B 10/073* (2013.01)

(52) U.S. Cl.
CPC ......... *H04B 10/503* (2013.01); *H04B 10/073* (2013.01)

(58) Field of Classification Search
CPC ...... H04B 10/03; H04B 10/032; H04B 10/07; H04B 10/07955; H04B 10/0791; H04B 10/0771; H04B 10/11; H04Q 2011/0081; H04Q 2011/0083; H04L 41/0654
See application file for complete search history.

(56) References Cited

U.S. PATENT DOCUMENTS

| | | | | |
|---|---|---|---|---|
| 10,461,851 | B1 * | 10/2019 | Zeng | H04B 10/503 |
| 2004/0161234 | A1 * | 8/2004 | Ozawa | H04J 14/02216 398/33 |
| 2016/0014829 | A1 | 1/2016 | Hasegawa | |
| 2016/0173190 | A1 * | 6/2016 | Skalecki | H04B 10/03 398/1 |

FOREIGN PATENT DOCUMENTS

| | | | |
|---|---|---|---|
| JP | H07-95153 | A | 4/1995 |
| JP | 2003-188829 | A | 7/2003 |
| JP | 2007-281992 | A | 10/2007 |
| JP | WO2014/133066 | A1 | 2/2017 |
| JP | WO2020/105143 | A1 | 4/2021 |

* cited by examiner

*Primary Examiner* — Hibret A Woldekidan
(74) *Attorney, Agent, or Firm* — Sughrue Mion, PLLC

(57) ABSTRACT

Provided is a novel optical space communication apparatus which is capable of inferring a hindrance factor to communication carried out with laser light. An optical space communication apparatus includes light receiving sections that each receive laser light and at least one processor, the at least one processor carrying out: a measurement process of measuring light receiving states of laser light at the respective light receiving sections; a determination process; and an inference process of inferring, based on the light receiving states of laser light, a hindrance factor to communication carried out with laser light.

10 Claims, 10 Drawing Sheets

(2) CASE WHERE COMMUNICATION HAS BEEN PERIODICALLY HINDERED BY VIBRATION
LIGHT SENDING AND RECEIVING SECTIONS
11-1X, 11-1Y, AND 11-2Y
T2
LIGHT RECEIVING LEVEL
TIME
PACKET LOSS
TIME
LIGHT SENDING AND RECEIVINGSECTIONS
11-2X, 11-1Z, AND 11-2Z
LIGHT RECEIVING LEVEL
TIME
PACKET LOSS
TIME (3) CASE WHERE COMMUNICATION HAS BEEN INTERMITTENTLY HINDERED DUE TO INFLUENCE OF WEATHER (4) CASE WHERE LASER LIGHT IS NO LONGER RECEIVED DUE TO INFLUENCE OF WEATHER

OPTICAL SPACE COMMUNICATION APPARATUS, CONTROL METHOD FOR CONTROLLING OPTICAL SPACE COMMUNICATION APPARATUS, AND CONTROL APPARATUS FOR CONTROLLING OPTICAL SPACE COMMUNICATION APPARATUS

This Nonprovisional application claims priority under 35 U.S.C. § 119 on Patent Application No. 2022-193136 filed in Japan on Dec. 1, 2022, the entire contents of which are hereby incorporated by reference.

TECHNICAL FIELD

The present invention relates to a technique for inferring a hindrance factor to communication carried out with laser light.

BACKGROUND ART

In optical space communication, which is wireless communication using laser light, if laser light serving as a communication data transmission medium is physically blocked by an external factor, the laser light does not reach an optical space communication apparatus of a communication partner (partner station) and communication is thus hindered. In order to improve availability in a communication network, there is a method in which a redundant communication path that serves as a candidate for a detour path is constructed as well as a current path of laser light, and if communication has been hindered, the current path of laser light is switched to the detour path.

However, it takes time to switch the path of laser light, and therefore, during that time, a state continues in which communication cannot be carried out. In order to further improve the availability of the communication network, it is necessary to carry out appropriate reconnection of communication in accordance with a hindrance factor to communication carried out with laser light. For this purpose, it is necessary to infer a hindrance factor to communication carried out with laser light, rather than switching paths in all cases where communication is hindered.

Patent Literature 1 discloses a technique for inferring a hindrance factor to communication carried out with laser light based on time series data of a light receiving level and an optical axis deviation amount.

CITATION LIST

Patent Literature

[Patent Literature 1]
Japanese Patent Application Publication Tokukai No. 2007-281992

SUMMARY OF INVENTION

Technical Problem

The technique disclosed in Patent Literature 1 is useful. Meanwhile, a novel optical space communication apparatus and techniques related thereto which are capable of inferring a hindrance factor to communication carried out with laser light are demanded.

An example object of an example aspect of the present invention is to provide a novel optical space communication apparatus and techniques related thereto which are capable of inferring a hindrance factor to communication carried out with laser light.

Solution to Problem

An optical space communication apparatus in accordance with an example aspect of the present invention includes a plurality of light receiving sections that each receive laser light, and at least one processor, the at least one processor carrying out: a measurement process of measuring light receiving states of the laser light at the respective plurality of light receiving sections; a determination process of determining whether or not communication carried out with the laser light is hindered; and an inference process of inferring, based on the light receiving states, a hindrance factor to the communication carried out with the laser light.

A control method in accordance with an example aspect of the present invention is a control method for controlling an optical space communication apparatus, the control method including: receiving laser light by a plurality of light receiving sections of the optical space communication apparatus; measuring light receiving states of the laser light at the respective plurality of light receiving sections by at least one processor of the optical space communication apparatus; determining, by the at least one processor, whether or not communication carried out with the laser light is hindered; and inferring, by the at least one processor based on the light receiving states, a hindrance factor to the communication carried out with the laser light.

A control apparatus in accordance with an example aspect of the present invention is a control apparatus for controlling an optical space communication apparatus, the optical space communication apparatus including a plurality of light receiving sections that each receive laser light, the control apparatus including at least one processor, the at least one processor carrying out: a measurement process of measuring light receiving states of the laser light at the respective plurality of light receiving sections; a determination process of determining whether or not communication carried out with the laser light is hindered; and an inference process of inferring, based on the light receiving states, a hindrance factor to the communication carried out with the laser light.

Advantageous Effects of Invention

According to an example aspect of the present invention, it is possible to provide a novel optical space communication apparatus and techniques related thereto which are capable of inferring a hindrance factor to communication carried out with laser light.

EXAMPLE EMBODIMENTS

[Example Object to be Attained by Example Embodiment]

The following description will discuss an example object to be attained by an example embodiment, with reference to a conventional technique.

As described above, conventionally, in a case where communication carried out with laser light has been hindered, a current path of laser light is switched to a detour path.

However, it takes time to switch the path of laser light, and therefore, during that time, a state continues in which communication cannot be carried out. In order to further improve the availability of the communication network, it is necessary to carry out appropriate reconnection of communication in accordance with a hindrance factor to communication carried out with laser light. For this purpose, it is necessary to infer a hindrance factor, rather than switching paths in all cases where communication is hindered.

Here, the technique disclosed in Patent Literature 1 is useful in which a hindrance factor is inferred based on time series data of a light receiving level and an optical axis deviation amount. However, a novel optical space communication apparatus and techniques related thereto which are capable of inferring a hindrance factor are demanded.

Moreover, in order to infer a hindrance factor, it is necessary for an optical space communication apparatus to include a number of dedicated sensors. This leads to an increase in cost and power consumption of the optical space communication apparatus. Therefore, it is demanded to infer a hindrance factor while avoiding use of a sensor as much as possible.

Therefore, an example object to be attained by an example embodiment is to provide a novel optical space communication apparatus and techniques related thereto which are capable of inferring a hindrance factor to communication carried out with laser light. Another example object is to provide an optical space communication apparatus and techniques related thereto which are capable of inferring, while avoiding use of a sensor as much as possible, a hindrance factor to communication carried out with laser light.

First Example Embodiment

The following description will discuss a first example embodiment of the present invention in detail, with reference to the drawings. The present example embodiment is a basic form of example embodiments described later.

(Configuration of Optical Space Communication Apparatus 10)

Figure 1:
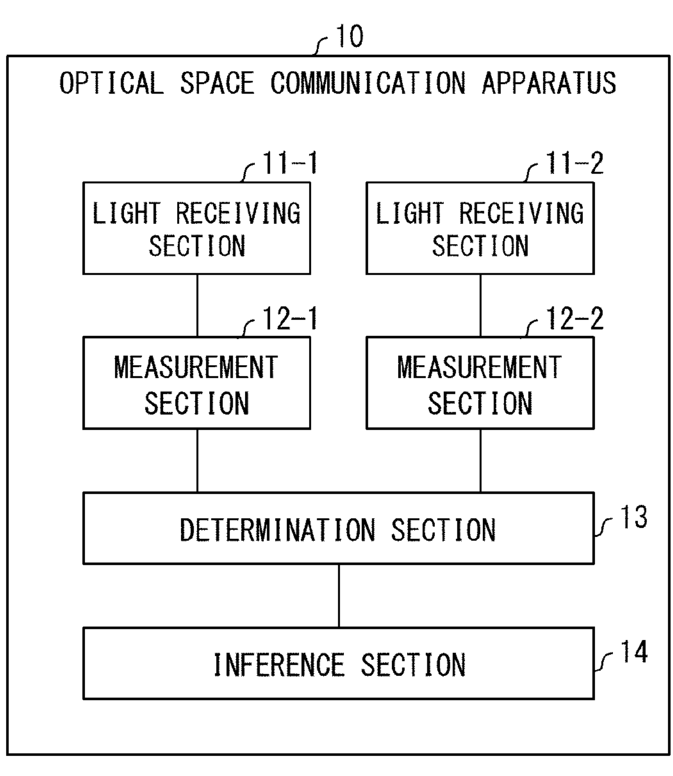
FIG. 1 is a block diagram illustrating a configuration of an optical space communication apparatus in accordance with a first example embodiment.

The following description will discuss a configuration of an optical space communication apparatus 10 in accordance with the present example embodiment, with reference to FIG. 1. FIG. 1 is a block diagram illustrating the configuration of the optical space communication apparatus 10. The optical space communication apparatus 10 carries out optical space communication with use of laser light. As illustrated in FIG. 1, the optical space communication apparatus 10 includes a plurality of light receiving sections (light receiving means) 11-1 and 11-2, measurement sections (measurement means) 12-1 and 12-2, a determination section (determination means) 13, and an inference section (inference means) 14. Note that the measurement sections 12-1 and 12-2, the determination section 13, and the inference section 14 are implementation examples of at least one processor.

The plurality of light receiving sections 11-1 and 11-2 are each a channel for receiving laser light. The measurement sections 12-1 and 12-2 measure laser light receiving states at the respective plurality of light receiving sections 11-1 and 11-2. Specifically, the measurement section 12-1 measures a light receiving state of the light receiving section 11-1 corresponding to the measurement section 12-1, and the measurement section 12-2 measures a light receiving state of the light receiving section 11-2 corresponding to the measurement section 12-2. The determination section 13 determines whether or not communication carried out with laser light is hindered. The inference section 14 infers, based on the light receiving states, a hindrance factor to communication carried out with laser light.

In the example illustrated in FIG. 1, the optical space communication apparatus 10 includes two light receiving sections 11-1 and 11-2. Note, however, that the number of light receiving sections is not particularly limited, as long as the optical space communication apparatus includes a plurality of light receiving sections. In the example illustrated in FIG. 1, the optical space communication apparatus 10 includes two measurement sections 12-1 and 12-2 which correspond to the respective two light receiving sections 11-1 and 11-2. Thus, the number of measurement sections is identical with that of the light receiving sections. The two measurement sections 12-1 and 12-2 of the optical space communication apparatus 10 measure light receiving states at the respective two light receiving sections 11-1 and 11-2. Note, however, that, in the optical space communication apparatus 10, it is only necessary that light receiving states at the respective plurality of light receiving sections 11-1 and 11-2 are measured by a measurement section(s), and the number of measurement sections is not particularly limited. For example, a single measurement section may measure light receiving states at the respective plurality of light receiving sections 11-1 and 11-2.

(Flow of Control Method S1 for Controlling Optical Space Communication Apparatus)

Figure 2:
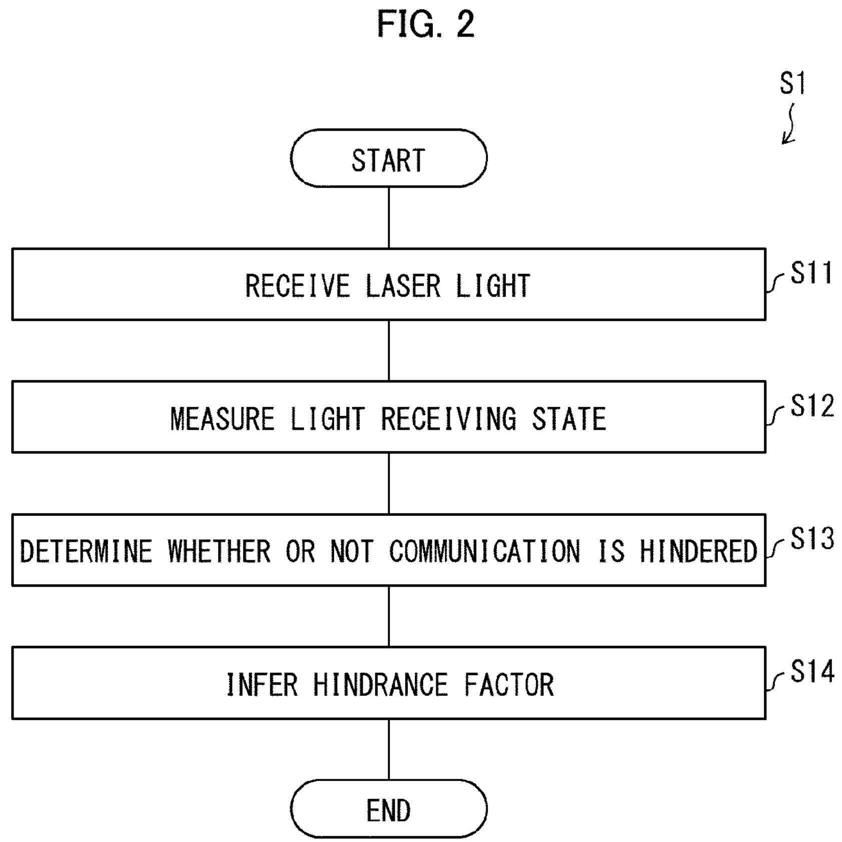
FIG. 2 is a flowchart illustrating a flow of a control method for controlling an optical space communication apparatus in accordance with the first example embodiment.

The following description will discuss a flow of a control method S1 for controlling an optical space communication apparatus in accordance with the present example embodiment, with reference to FIG. 2. FIG. 2 is a flowchart illustrating a flow of the control method S1 for controlling an optical space communication apparatus.

As illustrated in FIG. 2, the control method S1 for controlling an optical space communication apparatus includes steps S11, S12, S13, and S14. The following description will discuss an example in which the control method S1 is carried out by the sections included in the optical space communication apparatus 10. Note, however, that the control method S1 may be carried out by at least one processor. The at least one processor may be provided in the optical space communication apparatus 10, may be provided in another apparatus, or may be provided in a plurality of apparatuses.

In step S11, the plurality of light receiving sections 11-1 and 11-2 of the optical space communication apparatus 10 each receive laser light.

In step S12, the measurement sections 12-1 and 12-2 of the optical space communication apparatus 10 measure laser light receiving states at the respective plurality of light receiving sections 11-1 and 11-2.

For example, the measurement section 12-1 measures a light receiving state of the light receiving section 11-1, and the measurement section 12-2 measures a light receiving state of the light receiving section 11-2.

In step S13, the determination section 13 of the optical space communication apparatus 10 determines whether or not communication carried out with laser light is hindered. For example, in a case where a communication failure (communication error) has occurred in at least one of the plurality of light receiving sections 11-1 and 11-2, the determination section 13 determines that communication is hindered.

In step S14, the inference section 14 of the optical space communication apparatus 10 infers, based on the laser light receiving states, a hindrance factor to communication carried out with the laser light.

For example, the following description will discuss a case in which, among the plurality of light receiving sections 11-1 and 11-2, a value of a predetermined parameter indicating a light receiving state at the light receiving section 11-1 has been changed to a value that falls outside a predetermined range for less than a predetermined time period (e.g., less than 2 seconds, or the like instantaneously) and has then returned to a value falling within the predetermined range. In this case, the inference section 14 infers that the hindrance is caused because the communication has been hindered for less than a predetermined time period by blockage of a current path (optical path) of the laser light by a blocking article (obstacle) such as a bird, a bug, or dust. In a case where the value of the predetermined parameter indicating the light receiving state at the light receiving section 11-1 has not returned to a value within the predetermined range after being changed to a value outside the predetermined range for a predetermined time period or more, the inference section 14 infers that the hindrance is caused because the communication has been hindered by a blocking article for a predetermined time period or more.

(Control Program for Controlling Optical Space Communication Apparatus)

In a case where the optical space communication apparatus 10 is configured by a computer, the functions of the optical space communication apparatus 10 can be implemented by a control program below for controlling an optical space communication apparatus stored in a memory which is referred to by the computer.

A control program for controlling an optical space communication apparatus causes a computer to function as: the plurality of light receiving sections 11-1 and 11-2 that each receive laser light; the measurement sections 12-1 and 12-2 that measure laser light receiving states at the respective plurality of light receiving sections 11-1 and 11-2; the determination section 13 that determines whether or not communication carried out with the laser light is hindered; and the inference section 14 that infers, based on the laser light receiving states, a hindrance factor to the communication carried out with the laser light.

(Example Advantage of First Example Embodiment)

The present example embodiment employs the configuration in which: the plurality of light receiving sections 11-1 and 11-2 receive laser light; the measurement sections 12-1 and 12-2 measure light receiving states at the respective plurality of light receiving sections 11-1 and 11-2; the determination section 13 determines whether or not communication is hindered; and the inference section 14 infers, based on the light receiving states, a hindrance factor to the communication carried out with the laser light.

According to this configuration, the inference section 14 infers a hindrance factor based on measurement results of light receiving states at the respective plurality of light receiving sections 11-1 and 11-2. With the configuration, it is possible to appropriately infer a hindrance factor, as compared with a case where the inference section 14 infers a hindrance factor based on a measurement result of a light receiving state of a single light receiving section. Therefore, according to the present example embodiment, it is possible to bring about an example advantage of providing a novel optical space communication apparatus and techniques related thereto which are capable of inferring a hindrance factor.

Moreover, it is possible to bring about example advantages of providing an optical space communication apparatus and techniques related thereto which are capable of inferring a hindrance factor while avoiding use of a sensor as much as possible, and reducing a cost and power consumption, as compared with a configuration including many sensors.

Second Example Embodiment

The following description will discuss a second example embodiment of the present invention in detail, with reference to the drawings. The same reference numerals are given to constituent elements which have functions identical with those described in the first example embodiment, and descriptions as to such constituent elements are omitted as appropriate.

(Configuration of Control System 1 for Controlling Optical Space Communication Apparatus)

Figure 3:
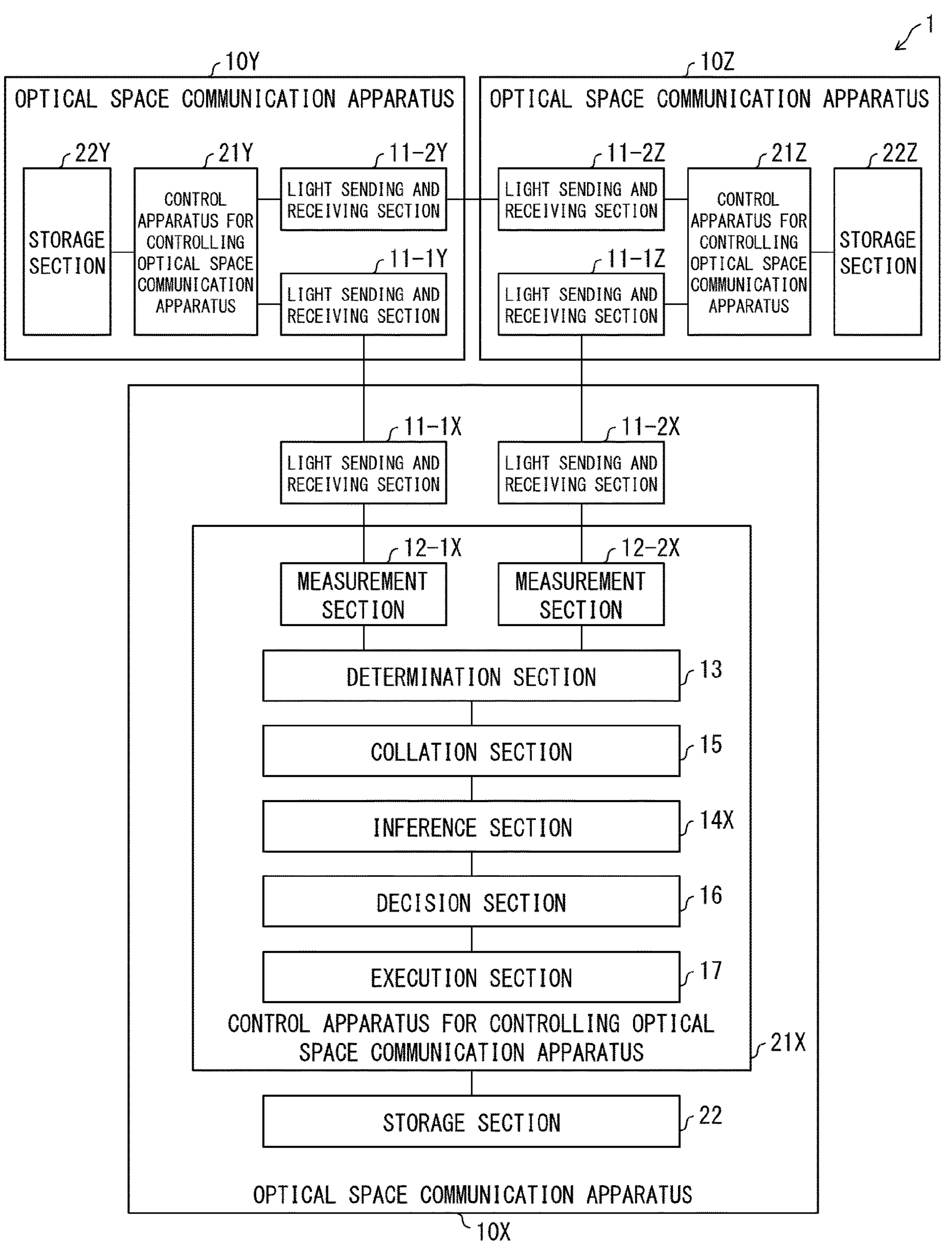
FIG. 3 is a block diagram illustrating a configuration of a control system for controlling an optical space communication apparatus in accordance with a second example embodiment.

The following description will discuss a configuration of a control system 1 for controlling an optical space communication apparatus in accordance with the present example embodiment, with reference to FIG. 3. FIG. 3 is a block diagram illustrating the configuration of the control system 1. The control system 1 controls optical space communication apparatuses 10X, 10Y, and 10Z each of which carries out communication with use of laser light. As illustrated in FIG. 3, the control system 1 includes the optical space communication apparatuses 10X, 10Y, and 10Z.

(Configuration of Optical Space Communication Apparatus 10X)

As illustrated in FIG. 3, the optical space communication apparatus 10X includes a plurality of light sending and receiving sections 11-1X and 11-2X, in place of the plurality of light receiving sections 11-1 and 11-2 in the first example embodiment. Each of the light sending and receiving sections 11-1X and 11-2X includes a light sending section (light sending means) and a light receiving section (light receiving means). The optical space communication apparatus 10X includes a control apparatus 21X (at least one processor) for controlling an optical space communication apparatus, in place of the measurement sections 12-1 and 12-2, the determination section 13, and the inference section 14. The optical space communication apparatus 10X further includes a storage section 22. The light sending and receiving section 11-1X carries out sending and receiving of laser light with a light sending and receiving section 11-1Y, and the light sending and receiving section 11-2X carries out sending and receiving of laser light with a light sending and receiving section 11-1Z.

The control apparatus 21X functions as a control section for controlling the optical space communication apparatus 10X. The control apparatus 21X includes measurement sections 12-1X and 12-2X, and an inference section 14X, in place of the measurement sections 12-1 and 12-2 and the inference section 14 in the first example embodiment. The control apparatus 21X further includes a collation section (collation means) 15, a decision section (decision means) 16, and an execution section (execution means) 17. The storage section 22 stores various kinds of data such as predetermined parameters indicating light receiving states such as light receiving levels and packet losses. Here, the term "light receiving level" means a level of intensity of laser light received by each of the plurality of light sending and receiving sections 11-1X and 11-2X. The term "packet loss" means the number of packets lost in communication via each of the plurality of light sending and receiving sections 11-1X and 11-2X.

The measurement sections 12-1X and 12-2X measure laser light receiving states at the respective plurality of light sending and receiving sections 11-1X and 11-2X. Specifically, the measurement section 12-1X measures a light receiving state at the light sending and receiving section 11-1X corresponding to the measurement section 12-1X, and the measurement section 12-2X measures a light receiving state at the light sending and receiving section 11-2X corresponding to the measurement section 12-2X. The collation section 15 collates the measurement results of the light receiving states measured by the measurement sections 12-1X and 12-2X with a plurality of pieces of pattern data which correspond to a plurality of types of hindrance factors. The decision section 16 decides, based on a hindrance factor which has been inferred by the inference section 14X, a reconnection method (reconnection sequence) for carrying out reconnection of communication. The execution section 17 carries out reconnection of communication by the reconnection method decided by the decision section 16. Details of the measurement sections 12-1X and 12-2X, and the inference section 14X will be described later.

(Configuration of Optical Space Communication Apparatus 10Y)

As illustrated in FIG. 3, the optical space communication apparatus 10Y includes a plurality of light sending and receiving sections 11-1Y and 11-2Y, a control apparatus 21Y (at least one processor) for controlling an optical space communication apparatus, and a storage section 22Y. The light sending and receiving section 11-1Y carries out sending and receiving of laser light with the light sending and receiving section 11-1X, and the light sending and receiving section 11-2Y carries out sending and receiving of laser light with a light sending and receiving section 11-2Z. In the example illustrated in FIG. 3, the control apparatus 21Y for controlling an optical space communication apparatus is similar to the control apparatus 21X, and the storage section 22Y is similar to the storage section 22X. Therefore, descriptions of these constituent elements are omitted here.

(Configuration of Optical Space Communication Apparatus 10Z)

As illustrated in FIG. 3, the optical space communication apparatus 10Z includes a plurality of light sending and receiving sections 11-1Z and 11-2Z, a control apparatus 21Z (at least one processor) for controlling an optical space communication apparatus, and a storage section 22Z. The light sending and receiving section 11-1Z carries out sending and receiving of laser light with the light sending and receiving section 11-2X, and the light sending and receiving section 11-2Z carries out sending and receiving of laser light with the light sending and receiving section 11-2Y. In the example illustrated in FIG. 3, the control apparatus 21Z for controlling an optical space communication apparatus is similar to the control apparatus 21X, and the storage section 22Z is similar to the storage section 22X. Therefore, descriptions of these constituent elements are omitted here.

(Flow of Control Method S1X for Controlling Optical Space Communication Apparatus)

Figure 4:
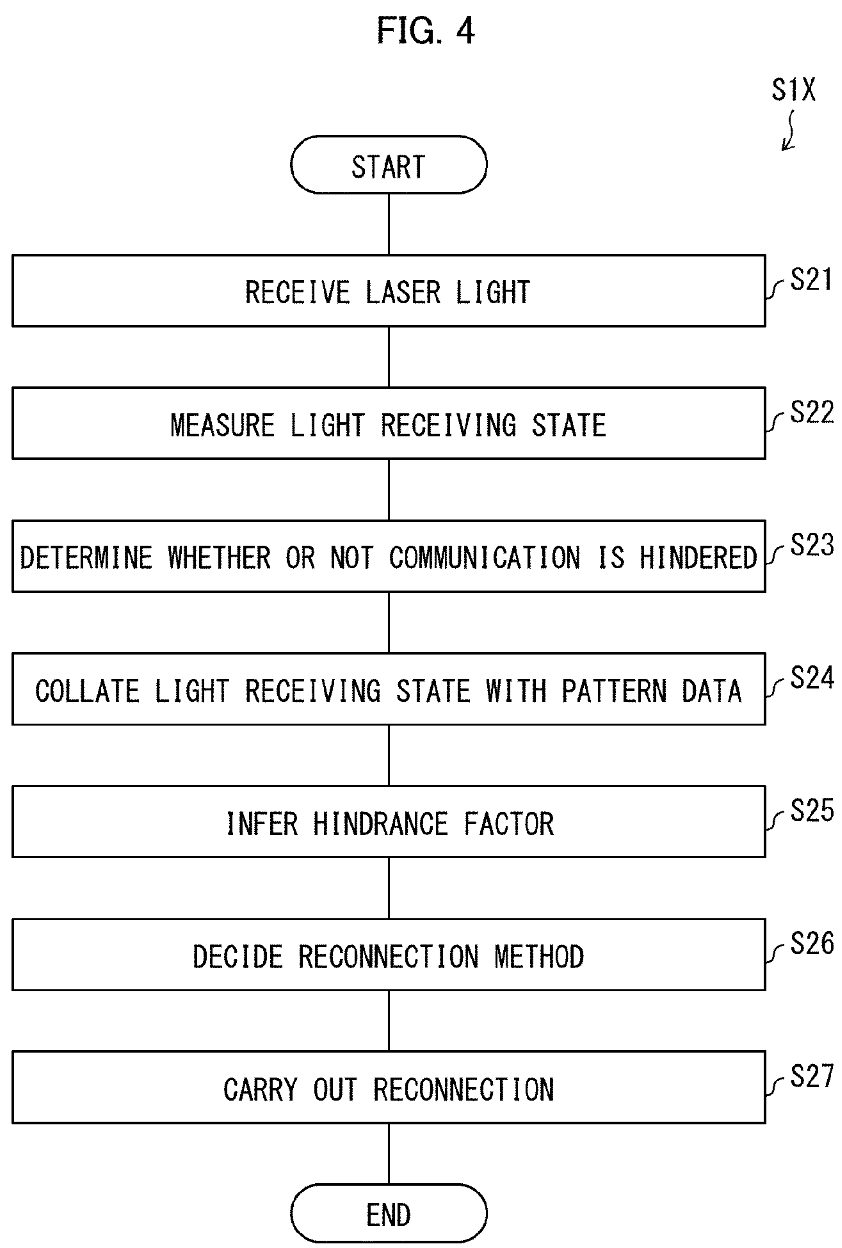
FIG. 4 is a flowchart illustrating a flow of a control method for controlling an optical space communication apparatus by a control system in accordance with the second example embodiment.
Figure 5:
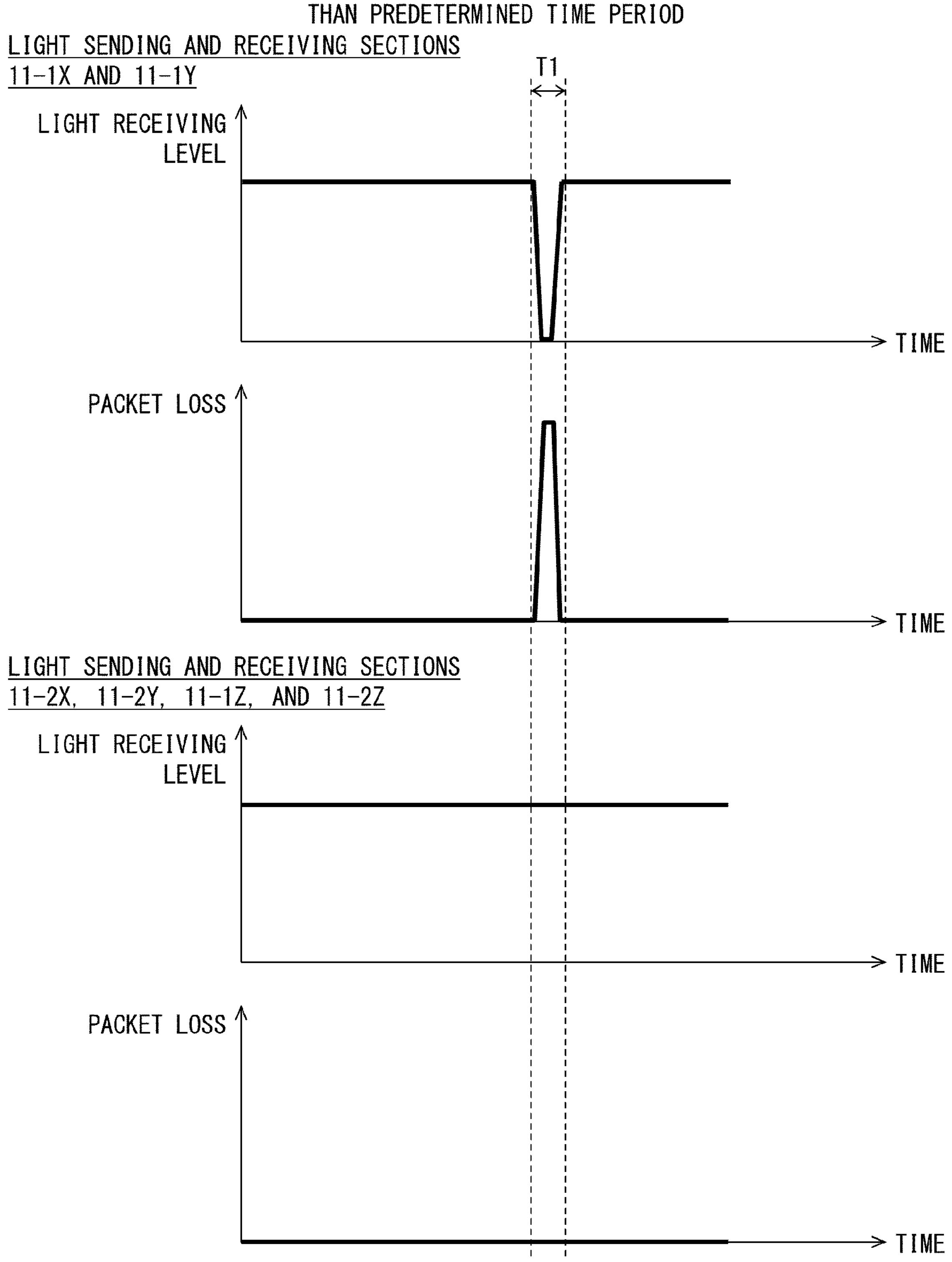
FIG. 5 is a graph for describing an example of a hindrance factor.
Figure 6:
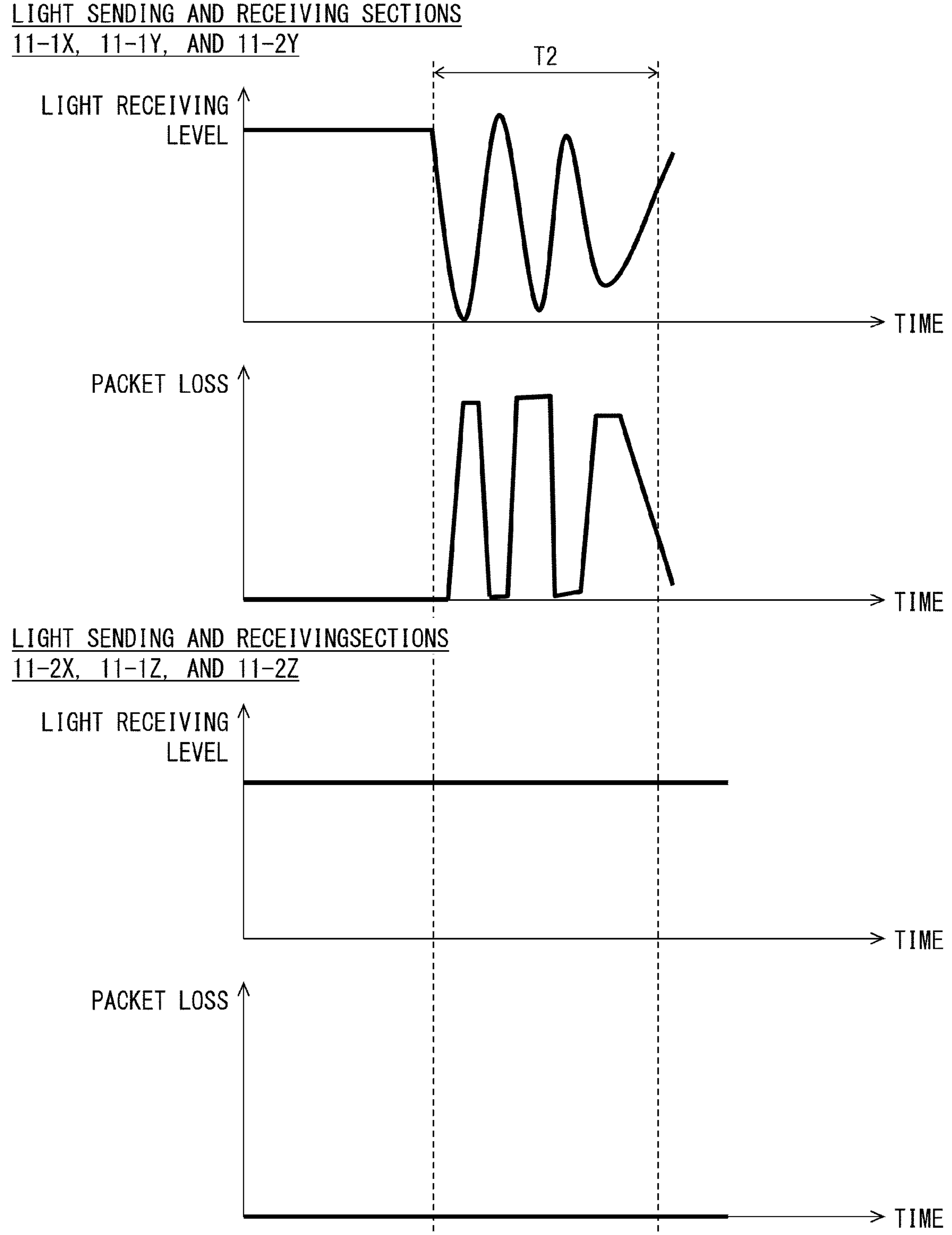
FIG. 6 is a graph for describing an example of a hindrance factor.
Figure 7:
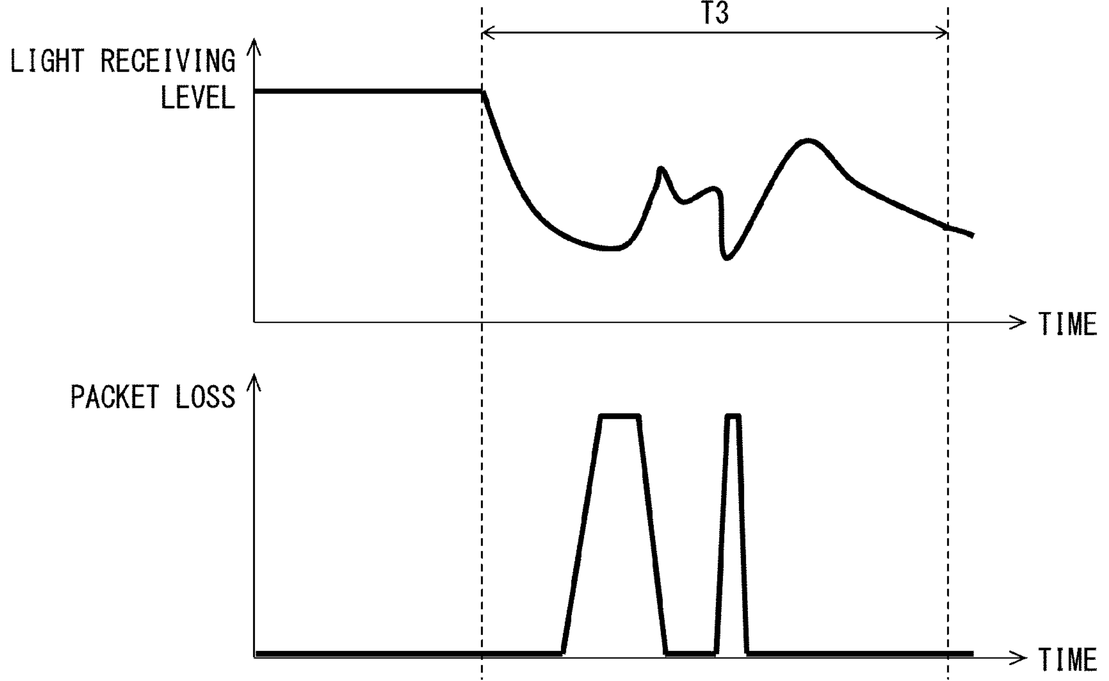
FIG. 7 is a graph for describing an example of a hindrance factor.
Figure 7:
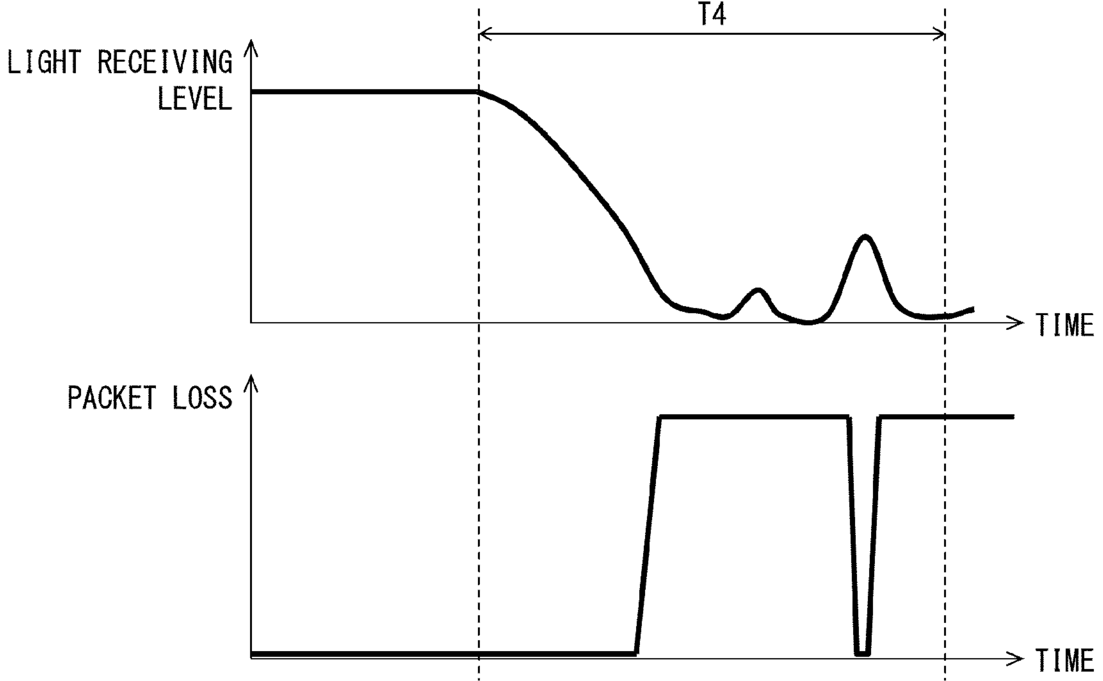

The following description will discuss a flow of a control method S1X for controlling an optical space communication apparatus in accordance with the present example embodiment, with reference to FIGS. 4 through 7. FIG. 4 is a flowchart illustrating a flow of the control method S1X for controlling an optical space communication apparatus. FIGS. 5 through 7 are each a graph for describing an example of a hindrance factor.

As illustrated in FIG. 4, the control method S1X for controlling an optical space communication apparatus includes steps S21, S22, S23, S24, S25, S26, and S27. Step S23 is similar to step S13 in the first example embodiment.

The following description will mainly discuss a case in which the control method S1X is carried out by the sections included in the optical space communication apparatus 10X. Note, however, that the control method S1X may be carried out by the sections included in the optical space communication apparatus 10Y or 10Z, or may be carried out by at least one processor. The at least one processor may be provided in the optical space communication apparatus 10X, may be provided in another apparatus such as the optical space communication apparatus 10Y or 10Z, or may be provided in a plurality of apparatuses.

(Step S21)

The plurality of light sending and receiving sections 11-1X and 11-2X of the optical space communication apparatus 10X each receive laser light. The light sending and receiving section 11-1X receives laser light from the light sending and receiving section 11-1Y, and the light sending and receiving section 11-2X receives laser light from the light sending and receiving section 11-1Z.

(Step S22)

The measurement sections 12-1X and 12-2X of the optical space communication apparatus 10X measure, as laser light receiving states at the respective plurality of light sending and receiving sections 11-1X and 11-2X, light receiving levels of laser light and/or packet losses in communication via the respective plurality of light sending and receiving sections 11-1X and 11-2X.

(Example of Step S22)

The following description will discuss an example of step S22 with reference to FIGS. 5 through 9. As illustrated in FIGS. 5, 6, 8, and 9, the measurement section 12-1X measures, as a light receiving state, a light receiving level and a packet loss of the light sending and receiving section 11-1X for a predetermined time period. The measurement section 12-2X measures, as a light receiving state, a light receiving level and a packet loss of the light sending and receiving section 11-2X for a predetermined time period. The measurement sections corresponding to the respective light sending and receiving sections 11-1Y and 11-2Y in the control apparatus 21Y for controlling the optical space communication apparatus 10Y measure, as light receiving states, light receiving levels and packet losses at the respective light sending and receiving sections 11-1Y and 11-2Y for a predetermined time period. The measurement sections corresponding to the respective light sending and receiving sections 11-1Z and 11-2Z in the control apparatus 21Z for controlling the optical space communication apparatus 10Z measure, as light receiving states, light receiving levels and packet losses at the respective light sending and receiving sections 11-1Z and 11-2Z for a predetermined time period. In a case where communication carried out with laser light has been intermittently hindered due to influence of weather as in FIG. 7, a light receiving level and a packet loss which are changed randomly as represented in FIG. 7 due to a natural phenomenon are measured as a light receiving state at each of the light sending and receiving sections of the optical space communication apparatuses 10X through 10Z. The following description will discuss a case in which light receiving states at the light sending and receiving sections 11-1X and 11-2X are measured as examples illustrated in (3) and (4) in FIG. 7, and descriptions of light receiving states at the other light sending and receiving sections are omitted. In this case, similarly to (3) and (4) in FIG. 7, light receiving levels and packet losses as light receiving states of the other light sending and receiving sections are randomly changed. However, those light receiving states are not limited to an example aspect in which the light receiving states are changed in a state completely identical with that in the light sending and receiving section 11-1X.

(Step S24)

The collation section 15 of the optical space communication apparatus 10X collates the measurement results of light receiving states at the respective plurality of light sending and receiving sections 11-1X and 11-2X with a plurality of pieces of pattern data which correspond to a plurality of types of hindrance factors. The collation section 15 may, at each of the plurality of light sending and receiving sections 11-1X and 11-2X, collate the plurality of pieces of pattern data with time series data of the light receiving level and the packet loss to decide a piece of pattern data which is closest to the time series data among the plurality of pieces of pattern data. A method in which the collation section 15 collates the plurality of pieces of pattern data with time series data of the light receiving level and the packet loss to decide a piece of pattern data which is closest to the time series data among the plurality of pieces of pattern data is not particularly limited, and may be, for example, a method using machine learning.

(Example of Step S24)

The following description will discuss an example of step S24 with reference to FIGS. 5 through 9. In the examples illustrated in FIGS. 5 through 9, the collation section 15 decides a piece of pattern data closest to time series data based on the time series data of light receiving levels and packet losses at the light sending and receiving sections 11-1Y, 11-2Y, 11-1Z, and 11-2Z of the optical space communication apparatuses 10Y and 10Z (partner stations) which are communication partners, in addition to the light sending and receiving sections 11-1X and 11-2X of its own station. In this case, the collation section 15 may, for example, refer to time series data of light receiving levels and/or packet losses which have been measured by the measurement sections of the control apparatuses 21Y and 21Z and which have been received by the communication section of the optical space communication apparatus 10X from the communication sections of the optical space communication apparatuses 10Y and 10Z.

Note, however, that the collation section 15 may decide, based on time series data of the light receiving levels and/or the packet losses of the light sending and receiving sections 11-1X and 11-2X of its own station, a piece of pattern data closest to the time series data. In this case, the collation section 15 cannot distinguish between a case (5) where communication has been hindered by a blocking article for a predetermined time period or more and a case (6) where laser light has deviated from its path due to external impact to an optical space communication apparatus, which will be described later, but can distinguish between the other cases.

The following example will discuss a case where six hindrance factors, which fall under respective cases (1) through (6) below and correspond to respective (i) through (vi) described later, correspond to six pieces of pattern data in a one-to-one manner. Note, however, that, the present example embodiment is not limited to the example below, and two or more types of hindrance factors may correspond to a single piece of pattern data, as long as a plurality of types of hindrance factors correspond to a plurality of pieces of pattern data. For example, among the plurality of types of hindrance factors, a blocking article corresponding to (v) described later and external impact to an optical space communication apparatus corresponding to (vi) described later may correspond to a single piece of pattern data.

(1) Case where Communication has been Hindered by Blocking Article for Less than Predetermined Time Period FIG. 5 illustrates light receiving states of the light sending and receiving sections 11-1X and 11-1Y in which a blocking article such as a bird, a bug, or dust has instantaneously blocked an optical path between the light sending and receiving sections 11-1X and 11-1Y, and changes have occurred, and light receiving states of the light sending and receiving sections 11-2X, 11-2Y, 11-1Z, and 11-2Z in which no change has occurred.

In the example illustrated in FIG. 5, the light receiving levels of the light sending and receiving sections 11-1X and 11-1Y are dropped to approximately 0 only for an instant during a time period (predetermined time period) T1, and are then immediately returned to the original levels. Moreover, a burst error in which many errors are continuously concentrated in a short section occurs in the packet losses of the light sending and receiving sections 11-1X and 11-1Y. The predetermined time period corresponding to the time period T1 can be, for example, 2 seconds. That is, the light receiving levels of the light sending and receiving sections 11-1X and 11-1Y are dropped to approximately 0 only for an instant (i.e., for less than 2 seconds), and then immediately return to the original levels, and a burst error in which many errors are continuously concentrated occurs for less than 2 seconds in the packet losses of the light sending and receiving sections 11-1X and 11-1Y, and then the state immediately returns to the original state. Meanwhile, there are no changes in light receiving levels and packet losses at the light sending and receiving sections 11-2X, 11-2Y, 11-1Z, and 11-2Z. As such, in the example illustrated in FIG. 5, a light receiving level of only a particular light sending and receiving section is dropped to approximately 0 only for an instant and then immediately returns to the original level, and a burst error occurs only for an instant in a packet loss of only a particular light sending and receiving section. In this case, the collation section 15 decides, as a piece of pattern data which is closest to time series data of the light receiving level and packet loss, a piece of pattern data in which communication has been hindered for less than a predetermined time period by instantaneous blockage of the optical path by a blocking article.

(2) Case where Communication has been Periodically Hindered by Vibration

FIG. 6 shows light receiving states of the light sending and receiving sections 11-1X, 11-1Y, and 11-2Y in which changes have occurred when vibration had occurred in the optical space communication apparatus 10Y (partner station), and light receiving states of the light sending and receiving sections 11-2X, 11-1Z, and 11-2Z in which no changes have occurred.

In the example illustrated in FIG. 6, the light receiving levels of the light sending and receiving sections 11-1X, 11-1Y, and 11-2Y are periodically increased and decreased repeatedly like waves for a time period (predetermined time period) T2 or more. Moreover, burst errors occur periodically in packet losses of the light sending and receiving sections 11-1X, 11-1Y, and 11-2Y. The predetermined time period corresponding to the time period T2 is not particularly limited, and may be different from the predetermined time period corresponding to the time period T1, as in the example illustrated in FIG. 6. In the example illustrated in FIG. 6, the optical space communication apparatus 10Y (partner station) vibrates, and the light receiving levels and the packet losses of both channels, i.e., the light sending and receiving sections 11-1X and 11-2X (i.e., all the channels of the vibrating optical space communication apparatus 10Y) of the partner station itself are changed. The light receiving level and the packet loss are changed in the light sending and receiving section 11-1X of the optical space communication apparatus 10X that is in communication with the light sending and receiving section 11-1Y of the vibrating optical space communication apparatus 10Y. In this case, the collation section 15 decides, as a piece of pattern data closest to time series data of the light receiving level and packet loss, a piece of pattern data in which laser light has periodically deviated from its optical path by vibration and communication has been periodically hindered.

(3) Case where Communication has been Intermittently Hindered Due to Influence of Weather The diagram of the case (3) where communication has been intermittently hindered due to influence of weather in FIG. 7 indicates light receiving states in which changes have occurred in both the light sending and receiving sections 11-1X and 11-2X of the optical space communication apparatus 10X (i.e., all channels of the optical space communication apparatus 10X) due to influence of weather such as rain.

In the example illustrated in (3) in FIG. 7, in all the channels of the optical space communication apparatus 10X, the light receiving levels are randomly increased and decreased repeatedly for a time period (predetermined time period) T3 or more, and burst errors sporadically occur. The predetermined time period corresponding to the time period T3 is not particularly limited, and may be different from the predetermined time period corresponding to each of the time periods T1 and T2, as in the example illustrated in (3) in FIG. 7. In this case, the collation section 15 decides, as a piece of pattern data closest to time series data of the light receiving level and the packet loss, a piece of pattern data in which communication has been intermittently hindered due to influence of weather such as rain and the optical path has been blocked. In the above example, for convenience, the light receiving states of all the channels of the optical space communication apparatus 10X are changed as in the example indicated in (3) in FIG. 7. Note, however, that, the light receiving levels and the packet losses of the light sending and receiving sections 11-1X and 11-2X of the optical space communication apparatus 10X are not limited to an example aspect of being changed in completely identical states, except that the light receiving levels and the packet losses are changed randomly. Typically, the light receiving levels and the packet losses at those light sending and receiving sections do not change in the completely identical states.

(4) Case where Laser Light is No Longer Sent and Received Due to Influence of Weather The diagram of the case (4) where laser light is no longer sent and received due to influence of weather in FIG. 7 indicates light receiving states in which changes have occurred in all channels of the optical space communication apparatus 10X due to influence of weather such as dense fog.

In the example illustrated in (4) in FIG. 7, the light receiving levels are gradually dropped to approximately 0 during a time period (predetermined time period) T4 in all channels of the optical space communication apparatus 10X. Moreover, during the predetermined time period, the light receiving levels are randomly increased and decreased, and burst errors occur frequently in each of all the channels of the optical space communication apparatus 10X. The predetermined time period corresponding to the time period T4 is not particularly limited, and may be similar to the predetermined time period corresponding to the time period T3, as in the example illustrated in (4) in FIG. 7. As such, the case illustrated in (4) in FIG. 7 is different from the case illustrated in (3) in FIG. 7 particularly in that the light receiving level is gradually dropped to approximately 0 during the predetermined time period in each of all the channels of the optical space communication apparatus 10X. In this case, the collation section 15 decides, as a piece of pattern data closest to time series data of the light receiving level and packet loss, a piece of pattern data in which laser light is no longer sent and received and has not been reached due to influence of weather such as dense fog. In the above example, for convenience, the light receiving states of all the channels of the optical space communication apparatus 10X are changed as in the example indicated in (4) in FIG. 7. Note, however, that, in the present example embodiment, the light receiving levels and the packet losses of the light sending and receiving sections 11-1X and 11-2X of the optical space communication apparatus 10X are not limited to an example aspect of being changed in completely identical states, except that the light receiving levels and the packet losses are changed randomly. Typically, the light receiving levels and the packet losses at those light sending and receiving sections do not change in the completely identical states.

Figure 8:
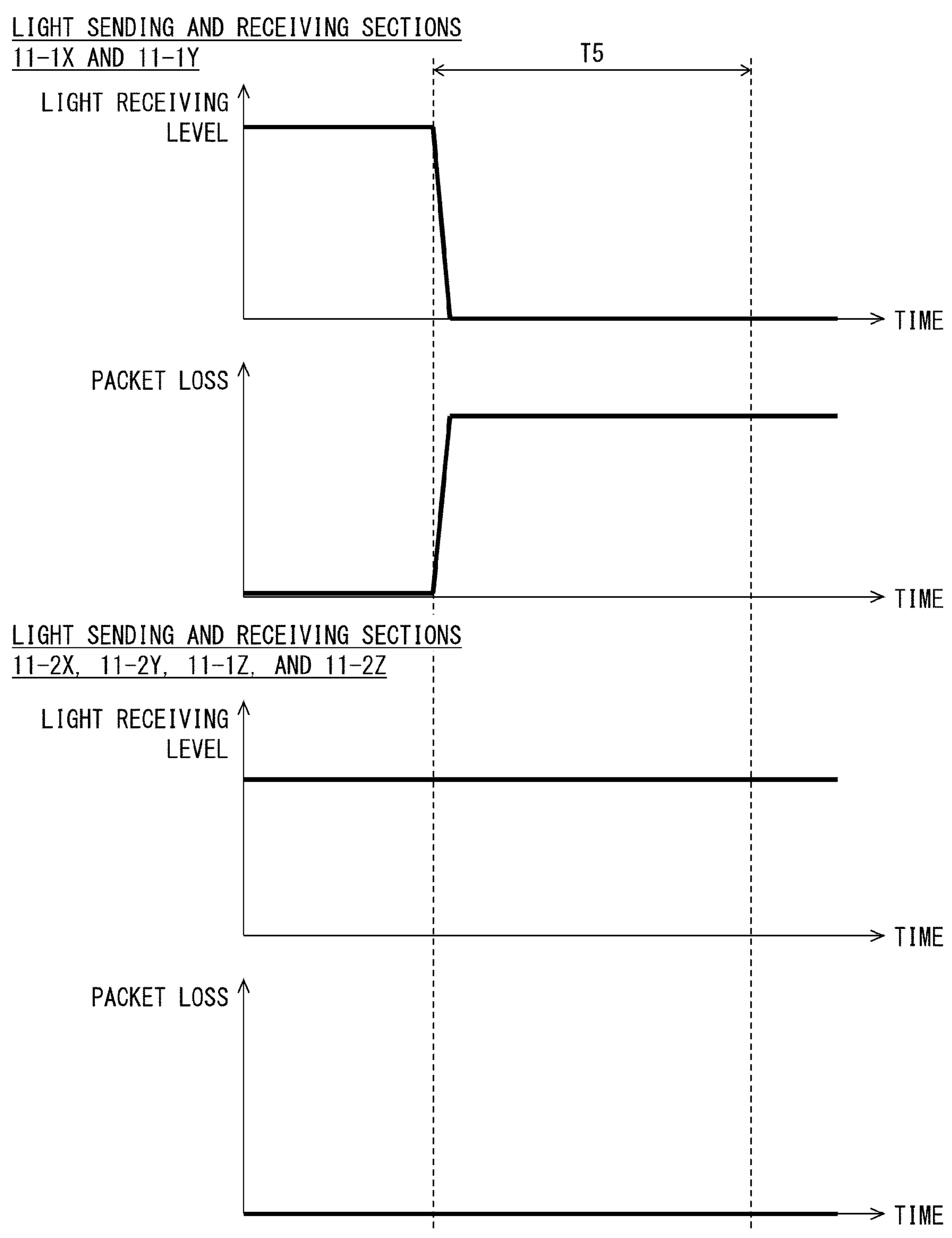
FIG. 8 is a graph for describing an example of a hindrance factor.

(5) Case where Communication has been Hindered by Blocking Article for Predetermined Time Period or More FIG. 8 illustrates light receiving states of the light sending and receiving sections 11-1X and 11-1Y in which a blocking article has blocked an optical path between the light sending and receiving sections 11-1X and 11-1Y for a predetermined time period or more and changes have occurred, and light receiving states of the light sending and receiving sections 11-2X, 11-2Y, 11-1Z, and 11-2Z in which no changes have occurred.

In the example illustrated in FIG. 8, the light receiving levels of the light sending and receiving sections 11-1X and 11-1Y are suddenly dropped to 0 during a time period (predetermined time period) T5, and that state is continued. Moreover, a burst error has suddenly occurred in the packet losses of the light sending and receiving sections 11-1X and 11-1Y, and that state is continued for the time period T5 or more. Meanwhile, there are no changes in light receiving levels and packet losses at the light sending and receiving sections 11-2X, 11-2Y, 11-1Z, and 11-2Z. In the example illustrated in FIG. 8, only a light receiving level of a particular light sending and receiving section is suddenly dropped to 0, and that state is continued, and a burst error has suddenly occurred in a packet loss only at a particular light sending and receiving section, and that state is continued. As such, the example illustrated in FIG. 8 is different from the example illustrated in FIG. 5 in that the time period during which the light receiving levels of the light sending and receiving sections 11-1X and 11-1Y are dropped to (approximately) 0 and the time period during which a burst error occurs in the packet losses are equal to or more than a predetermined time period (i.e., two seconds or more), and that state is continued. In this case, the collation section 15 decides, as a piece of pattern data which is closest to time series data of the light receiving level and packet loss, a piece of pattern data in which communication has been hindered by a blocking article for a predetermined time period or more.

Figure 9:
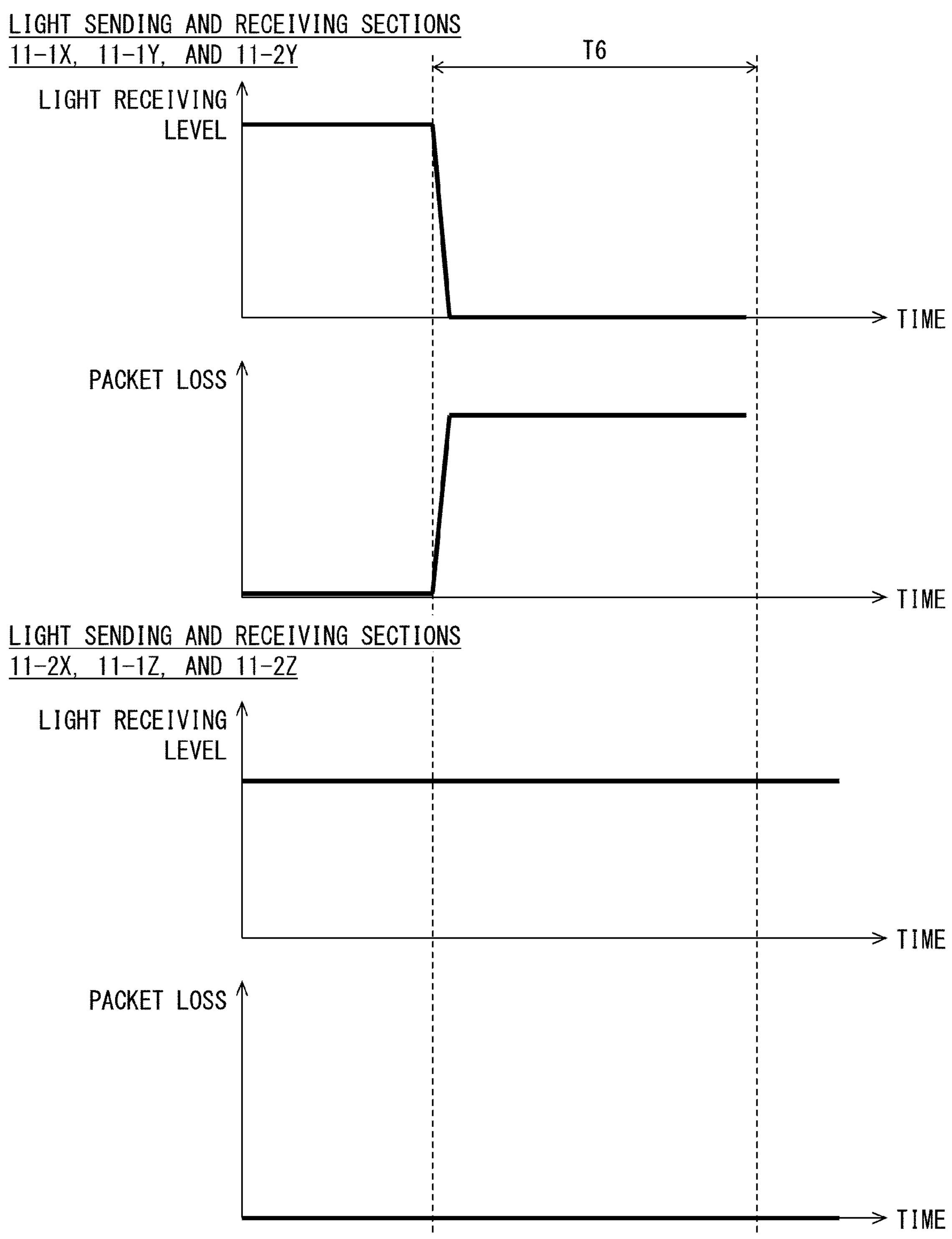
FIG. 9 is a graph for describing an example of a hindrance factor.

(6) Case where Laser Light has Deviated from its Path Due to External Impact to Optical Space Communication Apparatus FIG. 9 shows light receiving states of the light sending and receiving sections 11-1X, 11-1Y, and 11-2Y in which changes have occurred due to external impact to the optical space communication apparatus, and light receiving states of the light sending and receiving sections 11-2X, 11-1Z, and 11-2Z in which no changes have occurred.

In the example illustrated in FIG. 9, the light receiving levels of the light sending and receiving sections 11-1X, 11-1Y, and 11-2Y are suddenly dropped to 0 during a time period (predetermined time period) T6, and that state is continued. Moreover, a burst error has suddenly occurred in the packet losses of the light sending and receiving sections 11-1X, 11-1Y, and 11-2Y, and that state is continued for the time period T6 or more. Meanwhile, there are no changes in light receiving levels and packet losses at the light sending and receiving sections 11-2X, 11-1Z, and 11-2Z. In the example illustrated in FIG. 9, the optical space communication apparatus 10Y (partner station) has received impact, only the light receiving levels of particular light sending and receiving sections (i.e., all channels of the partner station) are suddenly dropped to 0, and that state is continued, and a burst error has suddenly occurred in the packet losses only at the particular light sending and receiving sections, and that state is continued. As such, the example illustrated in FIG. 9 is different from the example illustrated in FIG. 8 in that the time period during which the light receiving level is dropped to 0 and a burst error occurs in the packet loss is equal to or more than a predetermined time period, and the particular light sending and receiving sections where that state is continued are all the channels of the partner station that has received impact. In this case, the collation section 15 decides, as a piece of pattern data closest to time series data of the light receiving level and packet loss, a piece of pattern data in which laser light has permanently deviated from its path due to external impact to the optical space communication apparatus.

(Step S25)

The inference section 14X of the optical space communication apparatus 10X infers a hindrance factor based on a collation result between measurement results and a plurality of pieces of pattern data which have been collated by the collation section 15. The inference section 14X may infer a hindrance factor based on a piece of pattern data which is closest to time series data decided by the collation section 15. For example, the inference section 14X infers that the hindrance factor is at least one selected from the group consisting of a blocking article, vibration of its own station (optical space communication apparatus 10X) or a partner station (communication partner), and weather. The hindrance factor may be roughly classified into these three factors, and may be a combination of these. That is, these hindrance factors may occur simultaneously. Note, however, that the pattern data is close to one of (1) through (6) described above. Therefore, the inference section 14X may infer that the hindrance factor is any one of the following (i) through (vi) which correspond to the above-described (1) through (6).

(i) Communication has been hindered by a blocking article for less than a predetermined time period (ii) Communication has been periodically hindered by vibration (iii) Communication has been intermittently hindered due to influence of weather (iv) Laser light is no longer sent and received due to influence of weather (v) Communication has been hindered by a blocking article for a predetermined time period or more (vi) Laser light has deviated from its path due to external impact to an optical space communication apparatus An example in which the inference section 14X infers a hindrance factor will be described below with reference to FIGS. 5 through 9.

(1) Case where Communication has been Hindered by Blocking Article for Less than Predetermined Time Period The following description will discuss a case where, as illustrated in FIG. 5, the collation section 15 decides, as a piece of pattern data which is closest to time series data of the light receiving level and packet loss, a piece of pattern data in which communication has been hindered for less than a predetermined time period by instantaneous blockage of the optical path by a blocking article. In this case, the inference section 14X infers that the hindrance factor is the above-described (i).

(2) Case where Communication has been Periodically Hindered by Vibration

The following description will discuss a case where, as illustrated in FIG. 6, the collation section 15 decides, as a piece of pattern data closest to time series data of the light receiving level and packet loss, a piece of pattern data in which laser light has periodically deviated from its optical path by vibration and communication has been periodically hindered. In this case, the inference section 14X infers that the hindrance factor is the above-described (ii).

(3) Case where Communication has been Intermittently Hindered Due to Influence of Weather The following description will discuss a case where, as illustrated in (3) in FIG. 7, the collation section 15 decides, as a piece of pattern data closest to time series data of the light receiving level and the packet loss, a piece of pattern data in which communication has been intermittently hindered due to influence of weather such as rain and the optical path has been blocked. In this case, the inference section 14X infers that the hindrance factor is the above-described (iii).

(4) Case where Laser Light is No Longer Sent and Received Due to Influence of Weather The following description will discuss a case where, as illustrated in (4) in FIG. 7, the collation section 15 decides, as a piece of pattern data closest to time series data of the light receiving level and packet loss, a piece of pattern data in which laser light is no longer sent and received and has not been reached due to influence of weather such as dense fog. In this case, the inference section 14X infers that the hindrance factor is the above-described (iv).

(5) Case where Communication has been Hindered by Blocking Article for Predetermined Time Period or More The following description will discuss a case where, as illustrated in FIG. 8, the collation section 15 decides, as a piece of pattern data which is closest to time series data of the light receiving level and packet loss, a piece of pattern data in which communication has been hindered by a blocking article for a predetermined time period or more. In this case, the inference section 14X infers that the hindrance factor is the above-described (v).

(6) Case where Laser Light has Deviated from its Path Due to External Impact to Optical Space Communication Apparatus The following description will discuss a case where, as illustrated in FIG. 9, the collation section 15 decides, as a piece of pattern data closest to time series data of the light receiving level and packet loss, a piece of pattern data in which laser light has permanently deviated from its path due to external impact to the optical space communication apparatus. In this case, the inference section 14X infers that the hindrance factor is the above-described (vi).

(Step S26)

The decision section 16 of the optical space communication apparatus 10X decides, based on a hindrance factor which has been inferred by the inference section 14X, a reconnection method for carrying out reconnection of communication. The decision section 16 decides, as the reconnection method, at least one of the following (I) through (III).

(I) Reestablishment of communication connection in a higher-level layer (II) Readjustment of an optical axis of a light sending and receiving section (light sending means and/or light receiving means)

(III) Switching from a current laser light path to a detour path

The above (I) means a method in which, in a case where the optical axis of the light sending and receiving section has slightly deviated, reconnection of optical space communication is carried out by reestablishing a communication connection in a higher-level layer that is positioned higher than a layer of a certain level. The higher-level layer is, for example, an internet protocol (IP) layer such as the layer 3 that is positioned higher than the layer 2. The above (II) means a method in which, in a case where a light receiving level and a packet loss of the light sending and receiving section are periodically changed due to vibration or the like, reconnection of optical space communication is carried out by readjusting the optical axis of the light sending and receiving section to the original position in accordance with periodic changes. Examples of this method include: a method in which, in a case where the optical axis of the light sending and receiving section of its own station has deviated, an optical axis of a light sending section of its own station is readjusted so as to be aligned with a light receiving section of a partner station which has been originally in communication with its own station; and a method in which, in a case where the optical axis of the light sending and receiving section of its own station has deviated, an optical axis of a light receiving section of its own station is readjusted so as to be aligned with a light sending section of a partner station which has been originally in communication with its own station. The above (III) indicates a means for carrying out reconnection of optical space communication by switching the current path of laser light itself, in a case where sending and receiving of laser light by the light sending and receiving section is impossible (e.g., in a case where reconnection of communication cannot be carried out in the above (I) or (II)).

For example, in a case where the hindrance factor is the above (i), the decision section 16 decides the above (I) as at least one of reconnection methods. In a case where the hindrance factor is the above (ii), the decision section 16 decides the above (II) as at least one of reconnection methods. The decision section 16 may decide to wait without deciding a reconnection method instead of the above (II), in a case where the influence of weather is small (e.g., in a case where a change in the values of the light receiving level and the packet loss during the time period T3 is smaller than a predetermined value). The predetermined value here is not particularly limited, and can be, for example, a case where the value of the light receiving level during the time period T3 is equal to or less than half of the light receiving level before change. In a case where the hindrance factor is any of the above (iii) through (vi), the decision section 16 decides the above (III) as at least one of reconnection methods.

In a case where the hindrance factor is the above (v) or (vi), the decision section 16 may first decide the above (II) as a reconnection method. If reconnection of optical space communication is not carried out by the above (II), the decision section 16 may decide the above (III) as a reconnection method. As illustrated in FIG. 9, in a case where laser light has deviated from its path due to external impact to the optical space communication apparatus 10Y (partner station), light receiving levels and packet losses of both the light sending and receiving sections 11-1X and 11-2X of the partner station itself (i.e., all channels of the optical space communication apparatus 10Y) are changed. Moreover, the light receiving level and the packet loss are changed in the light sending and receiving section 11-1X of the optical space communication apparatus 10X that is in communication with the light sending and receiving section 11-1Y of the optical space communication apparatus 10Y. In such a case, the decision section 16 may issue an alarm. As such, the decision section 16 may decide a different reconnection method according to whether or not impact, vibration, or the like has occurred on one of the partner station and its own station.

(Step S27)

The execution section 17 of the optical space communication apparatus 10X carries out reconnection of communication by the reconnection method decided by the decision section 16.

For example, in a case where the decision section 16 has decided the above (I) as at least one of reconnection methods, the execution section 17 carries out reconnection of communication at least by the above (I). In a case where the decision section 16 has decided at least the above (II) as at least one of reconnection methods, the execution section 17 carries out reconnection of communication at least by the above (II). In a case where the decision section 16 has decided the above (III) as at least one of reconnection methods, the execution section 17 carries out reconnection of communication at least by the above (III).

Example Advantage of Second Example Embodiment

The present example embodiment employs the configuration in which the control apparatus 21X for controlling the optical space communication apparatus 10X including the plurality of light sending and receiving sections 11-1X and 11-2X includes: the measurement sections 12-1X and 12-2X that measure laser light receiving states at the respective plurality of light sending and receiving sections 11-1X and 11-2X; the determination section 13 that determines whether or not communication carried out with laser light is hindered; and the inference section 14X that infers, based on the light receiving states, a hindrance factor to the communication carried out with laser light.

According to this configuration, the inference section 14X of the control apparatus 21X infers a hindrance factor based on measurement results of light receiving states at the respective plurality of light sending and receiving sections 11-1X and 11-2X included in the optical space communication apparatus 10X. With the configuration, it is possible to appropriately infer a hindrance factor, as compared with a case where the inference section 14X infers a hindrance factor based on a measurement result of a light receiving state of a single light receiving section. Therefore, according to the present example embodiment, it is possible to bring about an example advantage of providing a novel control apparatus for controlling an optical space communication apparatus which is capable of inferring a hindrance factor, as with the first example embodiment.

Moreover, it is possible to bring about example advantages of providing a control apparatus for controlling an optical space communication apparatus which is capable of inferring a hindrance factor while avoiding use of a sensor as much as possible, and reducing a cost and power consumption, as compared with a configuration including many sensors.

The present example embodiment employs the configuration in which the optical space communication apparatus 10X further includes the collation section 15, and the inference section 14X infers a hindrance factor based on a collation result between measurement results and a plurality of pieces of pattern data which have been collated by the collation section 15.

According to this configuration, it is possible to infer a hindrance factor based on a collation result obtained by collating measurement results at the respective plurality of light sending and receiving sections 11-1X and 11-2X with a plurality of pieces of pattern data. Therefore, according to the present example embodiment, it is possible to bring about an example advantage of appropriately inferring a hindrance factor, in addition to the example advantage brought about by the first example embodiment.

The present example embodiment employs the configuration in which the measurement section 12X measures, at each of the plurality of light sending and receiving sections 11-1X and 11-2X, at least one selected from the group consisting of a light receiving level and a packet loss as a light receiving state of laser light.

According to this configuration, the inference section 14X can infer a hindrance factor based on the light receiving level and the packet loss while utilizing a function of measuring a light receiving level and a packet loss, which is usually implemented in the optical space communication apparatus 10X. Therefore, according to the present example embodiment, in addition to the example advantages brought about by the first example embodiment, it is possible to bring about example advantages of inferring a hindrance factor while avoiding use of a sensor as much as possible and reducing a cost and power consumption, as compared with a configuration including many sensors.

The present example embodiment employs the configuration in which: the collation section 15, at each of the plurality of light sending and receiving sections 11-1X and 11-2X, collates the plurality of pieces of pattern data with time series data of the light receiving level and the packet loss to decide a piece of pattern data which is closest to the time series data among the plurality of pieces of pattern data; and the inference section 14X infers the hindrance factor based on the piece of pattern data which has been decided, by the collation section 15, to be closest to the time series data.

According to this configuration, it is possible to infer a hindrance factor based on a piece of pattern data closest to time series data which has been decided by collating a plurality of pieces of pattern data with time series data of light receiving levels and packet losses at the respective plurality of light sending and receiving sections 11-1X and 11-2X. Therefore, according to the present example embodiment, it is possible to bring about an example advantage of more appropriately inferring a hindrance factor, in addition to the example advantage brought about by the first example embodiment.

The present example embodiment employs the configuration in which the inference section 14X infers that a hindrance factor is at least one selected from the group consisting of a blocking article, vibration of an optical space communication apparatus or a communication partner, and weather.

According to this configuration, it is possible to systematize hindrance factors. Therefore, according to the present example embodiment, it is possible to bring about an example advantage of applying a hindrance factor to a systematized one, in addition to the example advantage brought about by the first example embodiment.

The present example embodiment employs the configuration of further including the decision section 16 that decides, based on a hindrance factor which has been inferred by the inference section 14X, a reconnection method for carrying out reconnection of communication.

According to this configuration, it is possible to decide a reconnection method in accordance with the hindrance factor. Therefore, according to the present example embodiment, it is possible to bring about an example advantage of deciding a reconnection method suitable for a hindrance factor, in addition to the example advantage brought about by the first example embodiment.

The present example embodiment employs the configuration in which the decision section 16 decides, as a reconnection method, at least one of the foregoing (I) through (III).

According to this configuration, it is possible to decide a different reconnection method according to a hindrance factor, unlike the conventional technique in which the foregoing (III) is decided as a reconnection method regardless of a hindrance factor. Therefore, according to the present example embodiment, it is possible to bring about an example advantage of deciding an appropriate reconnection method in accordance with a hindrance factor, in addition to the example advantage brought about by the first example embodiment.

The present example embodiment employs the configuration in which: in a case where the hindrance factor is the foregoing (i), the decision section 16 decides the foregoing (I) as at least one of reconnection methods; in a case where the hindrance factor is the foregoing (ii), the decision section 16 decides the foregoing (II) as at least one of reconnection methods; and in a case where the hindrance factor is any of the foregoing (iii) through (vi), the decision section 16 decides the foregoing (III) as at least one of reconnection methods.

According to this configuration, it is possible to decide, in accordance with each of hindrance factors of the foregoing (i) through (vi), a reconnection method in which the foregoing (I) through (III) are appropriately combined. Therefore, according to the present example embodiment, in addition to the example advantage brought about by the first example embodiment, it is possible to bring about an example advantage that an appropriate reconnection method can be decided in accordance with each of hindrance factors of the foregoing (i) through (vi).

[Variation]

In the examples described above, the optical space communication apparatuses 10X, 10Y, and 10Z in the control system 1 include the control apparatuses 21X, 21Y, and 21Z, respectively. Note, however, that the control system 1 is not limited to such an example aspect, and it is possible that one of the optical space communication apparatuses 10X, 10Y, and 10Z includes a control apparatus for controlling an optical space communication apparatus, and functions as a central station having a function to control those optical space communication apparatuses. Alternatively, it is possible that, in the control system 1, none of the optical space communication apparatuses 10X, 10Y, and 10Z is provided with a control apparatus for controlling an optical space communication apparatus, and a control apparatus for controlling an optical space communication apparatus is provided outside the optical space communication apparatuses 10X, 10Y, and 10Z. In this case, control apparatuses that each control an optical space communication apparatus may be externally attached to the respective optical space communication apparatuses 10X, 10Y, and 10Z. Alternatively, a control apparatus for controlling an optical space communication apparatus as a central station which has a function to control those optical space communication apparatuses may be externally attached to those optical space communication apparatuses.

[Software Implementation Example]

The functions of part of or all of the apparatuses constituting the control system 1 for controlling an optical space communication apparatus can be realized by hardware such as an integrated circuit (IC chip) or can be alternatively realized by software.

Figure 10:
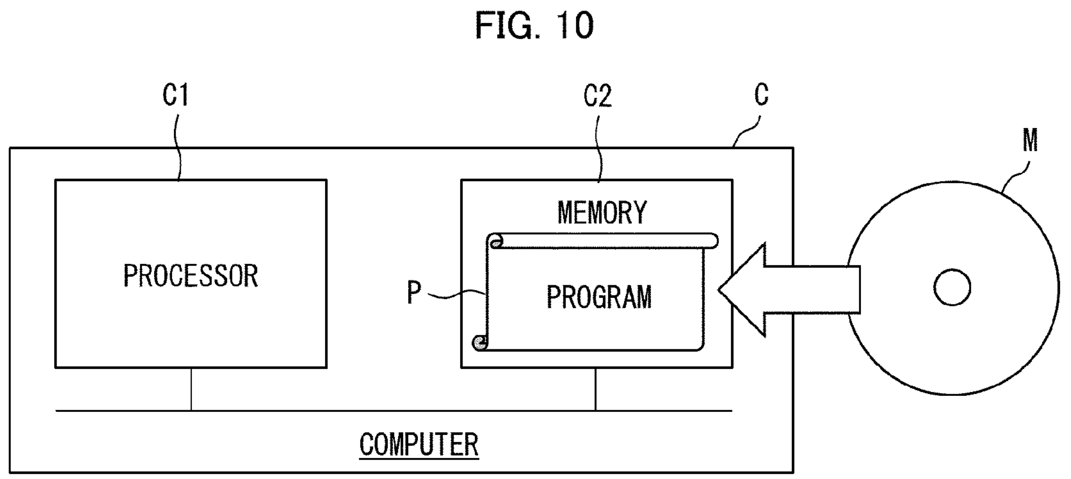
FIG. 10 is a diagram illustrating an example of a computer which executes instructions of a program that is software realizing functions of the apparatus in accordance with each of example embodiments.

In the latter case, each of the apparatuses constituting the control system 1 is realized by, for example, a computer that executes instructions of a program that is software realizing the foregoing functions. FIG. 10 illustrates an example of such a computer (hereinafter, referred to as "computer C"). The computer C includes at least one processor C1 and at least one memory C2. The memory C2 stores a program P for causing the computer C to function as each of the apparatuses constituting the control system 1. In the computer C, the processor C1 reads the program P from the memory C2 and executes the program P, so that the functions of each of the apparatuses constituting the control system 1 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

The computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a computer C-readable, non-transitory, and tangible storage medium M. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following supplementary notes.

(Supplementary Note 1)

An optical space communication apparatus including: a plurality of light receiving means each for receiving laser light; a measurement means for measuring light receiving states of the laser light at the respective plurality of light receiving means; a determination means for determining whether or not communication carried out with the laser light is hindered; and an inference means for inferring, based on the light receiving states, a hindrance factor to the communication carried out with the laser light.

(Supplementary Note 2)

The optical space communication apparatus according to supplementary note 1, further including: a collation means for collating measurement results of the light receiving states at the respective plurality of light receiving means with a plurality of pieces of pattern data which correspond to a plurality of types of hindrance factors, the inference means inferring the hindrance factor based on a collation result by the collation means.

(Supplementary Note 3)

The optical space communication apparatus according to supplementary note 2, in which: the measurement means, at each of the plurality of light receiving means, measures, as each of the light receiving states, at least one selected from the group consisting of a light receiving level of the laser light and a packet loss in communication carried out via that light receiving means.

(Supplementary Note 4)

The optical space communication apparatus according to supplementary note 3, in which: the collation means, at each of the plurality of light receiving means, collates the plurality of pieces of pattern data with time series data of the light receiving level and the packet loss to decide a piece of pattern data which is closest to the time series data among the plurality of pieces of pattern data; and the inference means infers the hindrance factor based on the piece of pattern data which has been decided, by the collation means, to be closest to the time series data.

(Supplementary Note 5)

The optical space communication apparatus according to any one of supplementary notes 1 through 4, in which: the inference means infers that the hindrance factor is at least one selected from the group consisting of a blocking article, vibration of the optical space communication apparatus or a communication partner, and weather.

(Supplementary Note 6)

The optical space communication apparatus according to any one of supplementary notes 1 through 5, further including: a decision means for deciding, based on the hindrance factor which has been inferred by the inference means, a reconnection method for carrying out reconnection of the communication.

(Supplementary Note 7)

The optical space communication apparatus according to supplementary note 6, further including: at least one light sending means that sends the laser light, the decision means decides, as the reconnection method, at least one selected from the group consisting of (I) reestablishment of communication connection in a higher-level layer, (II) readjustment of an optical axis of at least one selected from the group consisting of the light sending means and the plurality of light receiving means, and (III) switching of a current path of the laser light to a detour path.

(Supplementary Note 8)

The optical space communication apparatus according to supplementary note 7, in which: in a case where a hindrance is caused because (i) the communication has been hindered by a blocking article for less than a predetermined time period, the decision means decides, as the reconnection method, the (I) reestablishment of communication connection in a higher-level layer; in a case where a hindrance is caused because (ii) the communication has been periodically hindered by vibration, the decision means decides, as at least one reconnection method, the (II) readjustment of an optical axis of at least one selected from the group consisting of the light sending means and the plurality of light receiving means; in a case where a hindrance is caused because (iii) the communication has been intermittently hindered due to influence of weather, (iv) the laser light is no longer received due to influence of weather, (v) the communication has been hindered by the blocking article for a predetermined time period or more, or (vi) the laser light has deviated from its path due to external impact to the optical space communication apparatus, the decision means decides, as at least one reconnection method, the (III) switching of a current path of the laser light to a detour path.

(Supplementary Note 9)

A control method for controlling an optical space communication apparatus, the control method including: receiving laser light by a plurality of light receiving means of the optical space communication apparatus; measuring light receiving states of the laser light at the respective plurality of light receiving means by a measurement means of the optical space communication apparatus; determining, by a determination means of the optical space communication apparatus, whether or not communication carried out with the laser light is hindered; and inferring, by an inference means of the optical space communication apparatus based on the light receiving states, a hindrance factor to the communication carried out with the laser light.

(Supplementary Note 10)

A control apparatus for controlling an optical space communication apparatus, the optical space communication apparatus including a plurality of light receiving means that each receive laser light, the control apparatus including: a measurement means for measuring light receiving states of the laser light at the respective plurality of light receiving means; a determination means for determining whether or not communication carried out with the laser light is hindered; and an inference means for inferring, based on the light receiving states, a hindrance factor to the communication carried out with the laser light.

[Additional Remark 3]

The control apparatus for controlling an optical space communication apparatus may further include a memory. The memory may store a control program for controlling an optical space communication apparatus, the control program causing at least one processor to carry out: receiving laser light by a plurality of light receiving means of the optical space communication apparatus; measuring light receiving states of the laser light at the respective plurality of light receiving means by a measurement means of the optical space communication apparatus; determining, by a determination means of the optical space communication apparatus, whether or not communication carried out with the laser light is hindered; and inferring, by an inference means of the optical space communication apparatus based on the light receiving states, a hindrance factor to the communication carried out with the laser light. The control program can be stored in a computer-readable non-transitory tangible storage medium.

[Additional Remark 4]

An example aspect of the present invention makes it possible to provide a novel control apparatus for controlling an optical space communication apparatus and techniques related thereto which are capable of inferring a hindrance factor to communication carried out with laser light. Therefore, an example aspect of the present invention can contribute to achievement of the goal 9 "Build resilient infrastructure, promote inclusive and sustainable industrialization and foster innovation" of the sustainable development goals (SDGs).

REFERENCE SIGNS LIST

- 1: Control system for controlling optical space communication apparatus
- 10, 10X, 10Y, 10Z: Optical space communication apparatus
- 11-1, 11-2: Light receiving section (light receiving means)
- 11-1X, 11-1Y, 11-1Z, 11-2X, 11-2Y, 11-2Z: Light sending and receiving section (light sending means and light receiving means)
- 12-1, 12-1X, 12-1Z, 12-2, 12-2X, 12X: Measurement section (measurement means)
- 13: Determination section
- 14, 14X: Inference section (inference means)
- 15: Collation section (collation means)
- 16: Decision section (decision means)
- 21, 21X, 21Y: Control apparatus for controlling optical space communication apparatus
- S1, S1X: Control method for controlling optical space communication apparatus
- T1, T2, T3, T4, T5, T6: Time period (predetermined time period)

The invention claimed is:

1. An optical space communication apparatus comprising:

a plurality of light receiving sections that are each configured to receive laser light; and at least one processor, wherein the at least one processor is configured to carry out:

a measurement process comprising measuring light receiving states of the laser light at the respective plurality of light receiving sections;

a determination process comprising determining whether or not communication carried out with the laser light is hindered; and an inference process comprising inferring, based on the light receiving states, a hindrance factor to the communication carried out with the laser light.

2. The optical space communication apparatus according to claim 1, wherein the at least one processor is further to carry out a collation process comprising collating measurement results of the light receiving states at the respective plurality of light receiving sections with a plurality of pieces of pattern data which correspond to a plurality of types of hindrance factors, and wherein the at least one processor is configured to, in the inference process, infer the hindrance factor based on a collation result of the collation process.

3. The optical space communication apparatus according to claim 2, wherein the at least one processor is configured to, in the measurement process, at each of the plurality of light receiving sections, measure, as each of the light receiving states, at least one selected from the group consisting of a light receiving level of the laser light and a packet loss in communication carried out via that light receiving sections.

4. The optical space communication apparatus according to claim 3, wherein the at least one processor is configured to, in the collation process, at each of the plurality of light receiving sections, collate the plurality of pieces of pattern data with time series data of the light receiving level and the packet loss to decide a piece of pattern data which is closest to the time series data among the plurality of pieces of pattern data; and wherein the at least one processor is configured to, in the inference process, infer the hindrance factor based on the piece of pattern data which has been decided, in the collation process, to be closest to the time series data.

5. The optical space communication apparatus according to claim 4, wherein the at least one processor is configured to, in the inference process, infer that the hindrance factor is at least one selected from the group consisting of a blocking article, vibration of the optical space communication apparatus or a communication partner, and weather.

6. The optical space communication apparatus according to claim 1, wherein the at least one processor is further configured to carry out a decision process comprising deciding, based on the hindrance factor which has been inferred in the inference process, a reconnection method for carrying out reconnection of the communication.

7. The optical space communication apparatus according to claim 6, further comprising:

at least one light sending section configured to send the laser light, wherein the at least one processor is configured to, in the decision process, decide, as the reconnection method, at least one selected from the group consisting of (I) reestablishment of communication connection in a higher-level layer, (II) readjustment of an optical axis of at least one selected from the group consisting of the light sending section and the plurality of light receiving sections, and (III) switching of a current path of the laser light to a detour path.

8. The optical space communication apparatus according to claim 7, wherein the at least one processor is configured to, in the decision process, in a case where a hindrance is caused because (i) the communication has been hindered by a blocking article for less than a predetermined time period, decide, as the reconnection method, the (I) reestablishment of communication connection in a higher-level layer, wherein the at least one processor is configured to, in a case where a hindrance is caused because (ii) the communication has been periodically hindered by vibration, decide, as at least one reconnection method, the (II) readjustment of an optical axis of at least one selected from the group consisting of the light sending section and the plurality of light receiving sections, and wherein the at least one processor is configured to, in a case where a hindrance is caused because (iii) the communication has been intermittently hindered due to influence of weather, (iv) the laser light is no longer received due to influence of weather, (v) the communication has been hindered by the blocking article for a predetermined time period or more, or (vi) the laser light has deviated from its path due to external impact to the optical space communication apparatus, decide, as at least one reconnection method, the (III) switching of a current path of the laser light to a detour path.

9. A control method for controlling an optical space communication apparatus, the control method comprising:

receiving laser light by a plurality of light receiving sections of the optical space communication apparatus;

measuring light receiving states of the laser light at the respective plurality of light receiving sections by at least one processor of the optical space communication apparatus;

determining, by the at least one processor, whether or not communication carried out with the laser light is hindered; and inferring, by the at least one processor based on the light receiving states, a hindrance factor to the communication carried out with the laser light.

10. A control apparatus for controlling an optical space communication apparatus, the optical space communication apparatus including a plurality of light receiving sections that are each configured to receive laser light, the control apparatus comprising:

at least one processor being configured to carry out:

a measurement process comprising measuring light receiving states of the laser light at the respective plurality of light receiving sections;

a determination process comprising determining whether or not communication carried out with the laser light is hindered; and an inference process comprising inferring, based on the light receiving states, a hindrance factor to the communication carried out with the laser light.

* * * * *